D. W. BRISTOL & J. F. B. SEARCY.
Cotton, Corn, and Pea Planter.
No. 166,254. Patented Aug. 3, 1875.
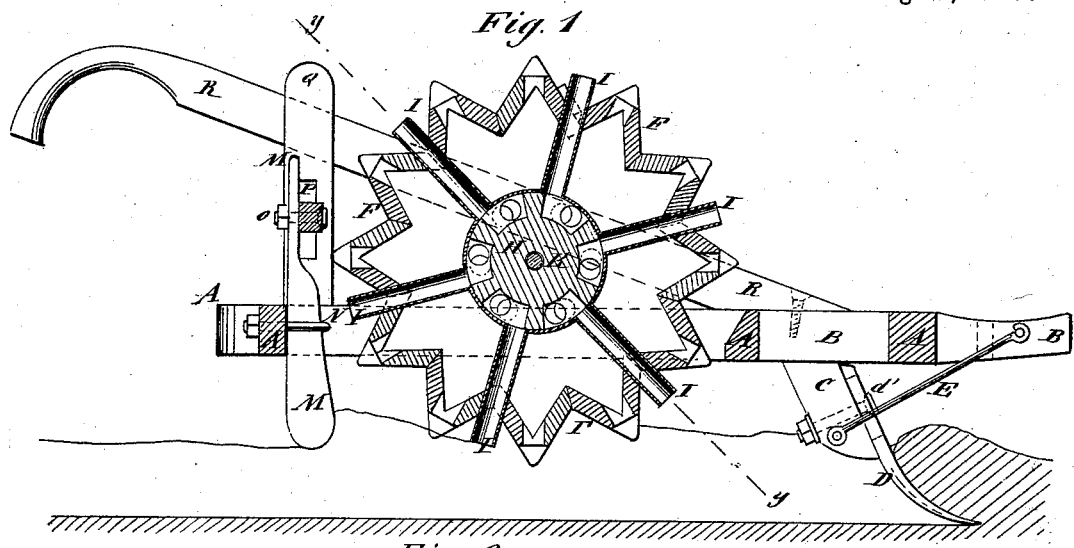
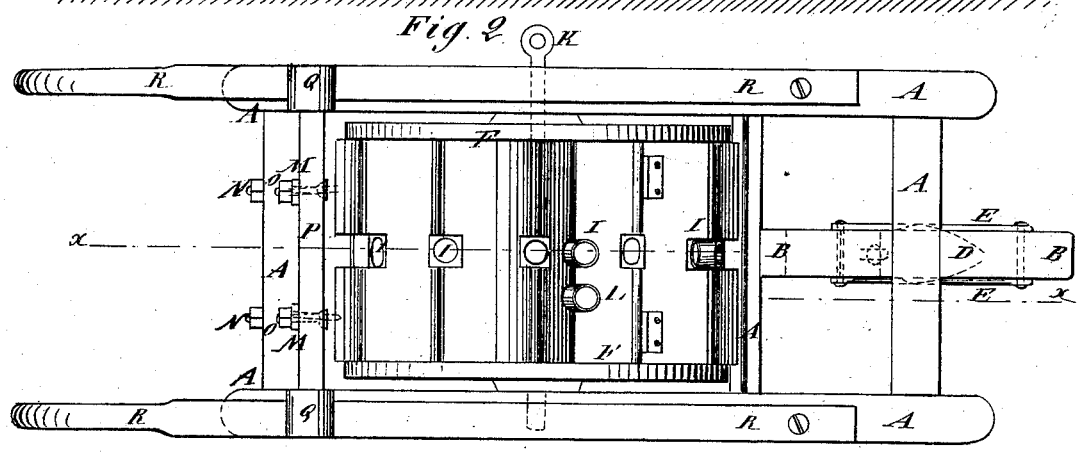
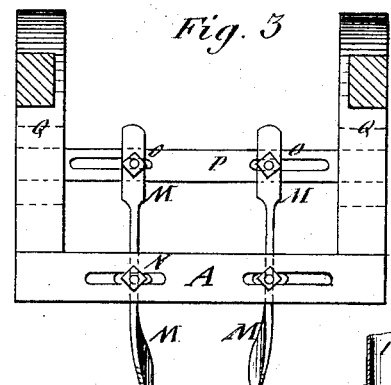
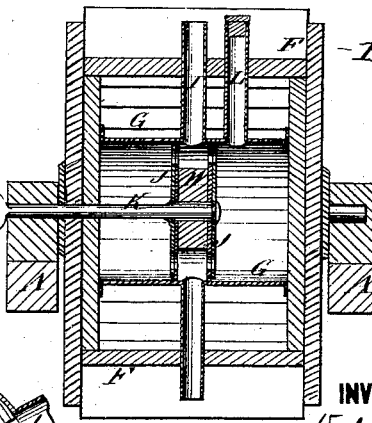
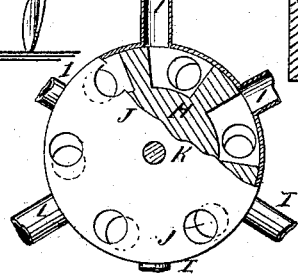
WITNESSES:
C. Neveux
A. F. Terry
INVENTOR:
D. W. Bristol and
J. F. B. Searcy
BY
ATTORNEYS.
N. PETERS, PHOTO-LITHOGRAPHER, WASHINGTON, D. C.

UNITED STATES PATENT OFFICE.

DWIGHT W. BRISTOL AND JOHN F. B. SEARCY, OF PLEASANT HILL, MISS.

IMPROVEMENT IN COTTON, CORN, AND PEA PLANTERS.

Specification forming part of Letters Patent No. 166,254, dated August 3, 1875; application filed May 28, 1875.

*To all whom it may concern:*

Be it known that we, DWIGHT W. BRISTOL and JOHN F. B. SEARCY, of Pleasant Hill, in the county of De Soto and State of Mississippi, have invented a new and useful Improvement in Cotton, Corn, and Pea Planter, of which the following is a specification:

Figure 1 is a vertical longitudinal section of our improved machine taken through the line *x x*, Fig. 2. Fig. 2 is a top view of the same. Fig. 3 is a rear view of the same, the handles being shown in section. Fig. 4 is a detail cross-section of the same taken through the line *y y*, Fig. 1. Fig. 5 is a detail side view of the corn and pea dropping wheel, part being broken away to show the construction.

Similar letters of reference indicate corresponding parts.

The object of this invention is to furnish an improved planter for planting cotton, corn, and pease, which shall be simple in construction, convenient in use, and reliable in operation, planting the seeds regularly and uniformly, and which may be adjusted to plant more or less seed, as may be desired, and to plant the seed deeper or shallower, as may be required.

The invention consists in the combination of the angular-faced drum, the inner drum, the recessed wheel, and the tubes with each other and with the frame of the planter, in the combination of the perforated disks and the rod with the wheel and the drums.

A is the frame of the planter, which consists of two side bars connected at their rear ends by a cross-bar, and near their forward ends by two cross-bars. B is the draft-bar, to the forward end of which the draft is applied, and which is framed to the centers of the two forward cross-bars of the frame A. To the draft-bar B, between the forward cross-bars of the frame A, is attached the upper end of the standard C, to the forward side of the lower part of which is attached the opening-plow D by means of a bolt, *d'*, that passes through a longitudinal slot in the said plow, and through a hole in the said standard, so that the said plow can be readily adjusted to work deeper or shallower in the ground, as may be desired. The draft-strain upon the standard C is sustained by the brace-rods E, the rear ends of which are bolted to the opposite sides of the lower end of said standard, and their forward ends are bolted to the opposite sides of the forward end of the draft-bar B. F is a drum, the ends of which are circles, and the face of which is formed of boards arranged at an angle with each other, so that the face of the said drum may be formed of twelve, more or less, salient and as many re-entrant angles. The journals of the drum F revolve in bearings attached to the side bars of the frame A. Within the drum F is secured a smaller drum, G, in the middle part of which is secured a wheel, H, from which six, more or less, radial tubes, I, lead out through the faces of the drums G and F. In the wheel H, at the inner ends of the tubes I, are formed recesses, into which the seed passes through holes in the side plates attached to the sides of the said wheel and forming a part thereof. Upon the opposite sides of the wheel H are placed circular plates J, in which are formed holes corresponding in position with the holes in the side plates of the wheel H, so that by turning the disks or plates J the size of the holes leading into the recesses in the wheel H may be adjusted to allow more or less seed to enter the said recesses and pass out through the tubes I. The plates J are rigidly secured to the rod K, which passes through the wheel H and through the end of the drum F. The rod K may be the inward extension of one of the journals of the drum F, or one of said journals may be made hollow, and the rod K may pass through it. Upon the outer end of the rod K is formed a handle for convenience in turning it to adjust the plates J.

When the machine is to be used for planting corn and pease, the seed is introduced into the inner drum G through a tube, L, leading in through the faces of the drums F G.

When the machine is to be used for planting cotton, the seed is placed in the space between the faces of the drums F G and escapes through holes in the centers of the salient angles of said drum F. One of the salient angles of the drum F is left loose, and is hinged at one edge and secured at the other edge with a button, so that it may be conveniently opened to pour in the cotton-seed. The drum is revolved by contact with the ground, and discharges the seed uniformly into the furrow opened by the plow D.

M are the covering-plates, the shanks of which pass up through the eyes of the eyebolts N, and have holes in their upper ends to receive the bolts O, by which they are secured to the cross-bar P. The eyebolts N pass through longitudinal slots in the rear cross-bar of the frame A, and the bolts O pass through longitudinal slots in the cross-bar P, so that the covering-plows can be adjusted wider apart or closer together by loosening the nut of the bolts N and O. The ends of the cross-bar P work in vertical slots in the uprights Q attached to the rear parts of the side bars of the frame A, so that the plows M may be adjusted to work deeper or shallower in the ground by loosening the nuts of the eyebolts N. R are the handles, the forward ends of which are attached to the forward parts of the side bars of the frame A, and their rear parts are attached to the upper ends of the uprights Q.

Having thus described our invention, we claim as new and desire to secure by Letters Patent—

1. The combination of the angular-faced drum F, the inner drum G, the recessed wheel H, and the tubes I with each other and with the frame A of the planter, substantially as herein shown and described.

2. The combination of the perforated disks J and the rod K with the wheel H and the drums F G, substantially as herein shown and described.

DWIGHT W. BRISTOL.
JOHN F. B. SEARCY.

Witnesses:
THOS. O. BRIDGFORTH,
T. J. WILROY.